J. SLOBODA.
MILK BOILER.
APPLICATION FILED MAR. 31, 1921.

1,392,664.

Patented Oct. 4, 1921.
2 SHEETS—SHEET 1.

Inventor
J. Sloboda

By F. W. Bryant
Attorney

J. SLOBODA.
MILK BOILER.
APPLICATION FILED MAR. 31, 1921.
1,392,664.
Patented Oct. 4, 1921.
2 SHEETS—SHEET 2.
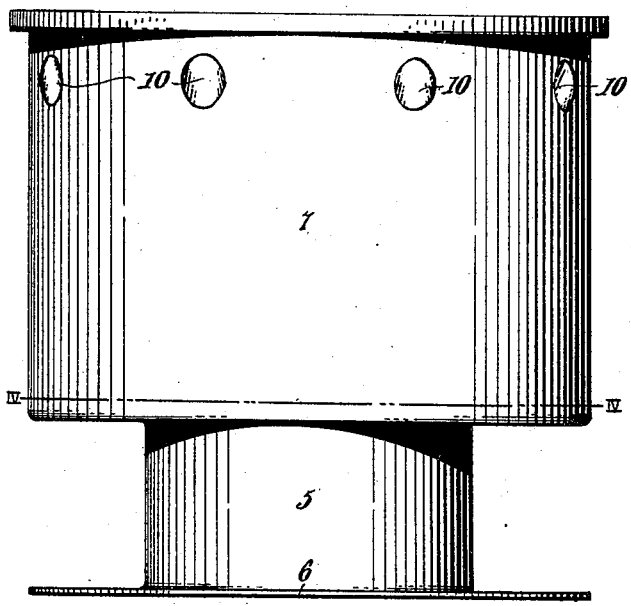
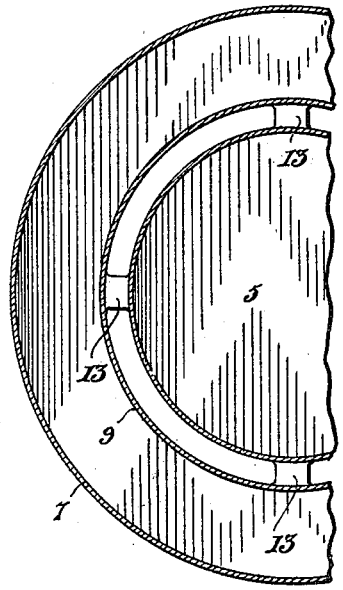
Inventor
J. Sloboda
By F. W. Bryant
Attorney

UNITED STATES PATENT OFFICE.

JOSEPH SLOBODA, OF CHARLEROI, PENNSYLVANIA.

MILK-BOILER.

1,392,664.     Specification of Letters Patent.     Patented Oct. 4, 1921.

Application filed March 31, 1921. Serial No. 457,371.

*To all whom it may concern:*

Be it known that I, JOSEPH SLOBODA, a citizen of the United States of America, residing at Charleroi, in the county of Washington and State of Pennsylvania, have invented certain new and useful Improvements in Milk-Boilers, of which the following is a specification.

This invention relates to certain new and useful improvements in milk boilers wherein provision is made for the reception and cooling of the overflow from the main or boiling compartment or receptacle of the device.

The object is to simplify and improve devices of this character and to this end the invention consists in the novel form, combination and arrangement of parts hereinafter described and shown in the accompanying drawings and claimed.

Figure 1:
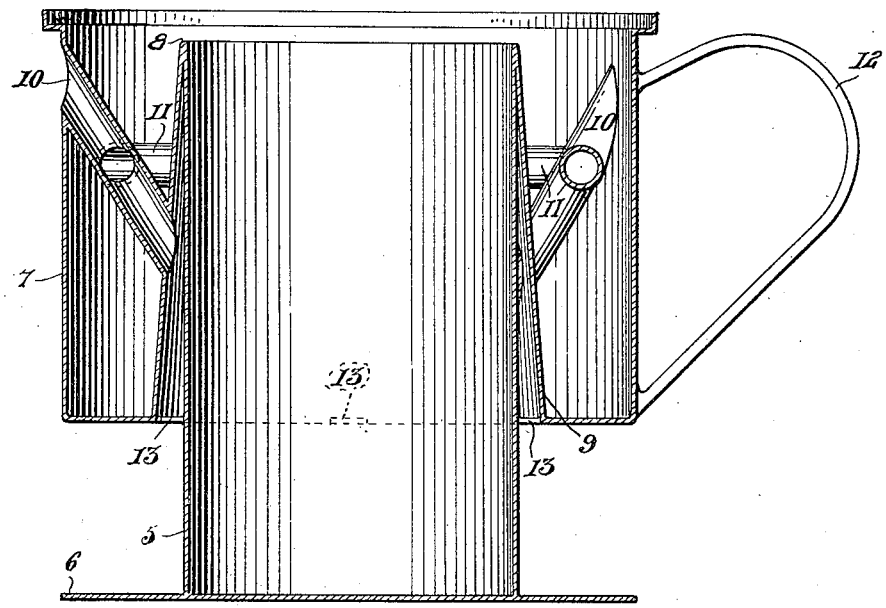
Figure 2:
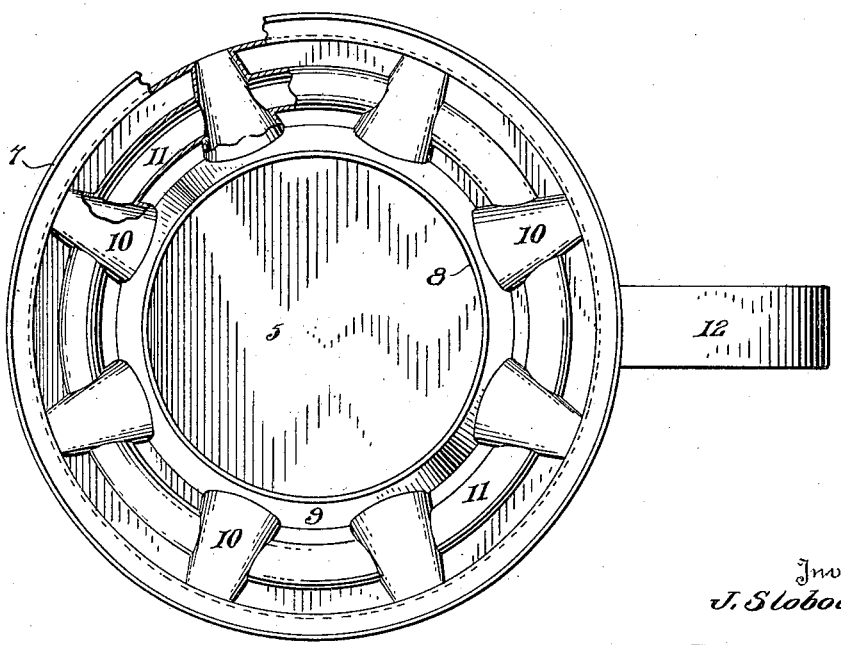

In the drawings forming a part of this specification, and in which like reference characters designate corresponding parts throughout the several views, Figure 1 is a central vertical sectional view of one form of milk boiler constructed in accordance with the present invention, Fig. 2 is a top plan view thereof partly broken away, Fig. 3 is a side elevational view of the same, and Fig. 4 is a fragmentary view in horizontal section along line IV—IV of Fig. 3.

Referring more in detail to the several views, and particularly to the form of the invention shown in Figs. 1 to 4 inclusive, the present milk boiler preferably comprises a central main receptacle 5 having an annular relatively wide base flange 6 coextensive with the bottom wall thereof whereby the boiler is effectively supported upon a stove against tilting, the receptacle 5 being surrounded by an annular trough-shaped receptacle 7 which has its inner wall attached to the receptacle 5 as at 8 at the upper end of said wall and the upper end of the receptacle 5, the inner wall 9 of the trough-shaped receptacle being of downwardly flaring form so as to leave a space between the two receptacles. The walls of the receptacle 7 are connected by a series of spaced upwardly and outwardly inclined tubes 10 which communicate with openings in said walls whereby a passage is presented for permitting the air to pass from the space between the two receptacles to a point beyond the outer wall of the receptacle 7 so as to cool said tubes 10 and consequently cool the milk which surrounds the latter and which has overflowed into the outer receptacle from the main receptacle 5 by excessive boiling. The inclined tubes 10 are also preferably interconnected by means of a series of curved tubular sections or pipes 11 so as to increase the cooling surface, the tubes 10 and 11 being disposed beneath the upper edges of the receptacles as clearly shown in Figs. 1 and 2 and the upper edge of the outer wall of the trough-shaped receptacle 7 being slightly higher than the inner wall thereof and the wall of the main receptacle 5. A suitable handle 12 may be attached to the trough-shaped receptacle 7 for an obvious purpose. The bottom of the trough-shaped receptacle 7 may be rigidly connected with the main receptacle 5 at a suitable distance above the bottom of the latter by means of radial webs 13 so as to provide a more rigid and durable construction.

In operation, the milk is placed within the main receptacle 5 and should the same boil over, it will pass into the trough-shaped receptacle 7 and by contacting the tubes 10 and 11, the milk will be slightly cooled for preventing further overflowing of the milk from said trough-shaped receptacle, the tubes being cooled by the circulation of air therethrough.

It is believed that the construction and operation as well as the advantages of the present invention will be readily understood and appreciated by those skilled in the art.

Minor changes may be made without departing from the spirit and scope of the invention as claimed.

What is claimed as new is:

A milk boiler comprising a central main receptacle having a bottom wall, means including a side and a bottom wall forming an overflow chamber of annular form about the main receptacle with the bottom of the overflow chamber placed above the bottom of the main receptacle, said side wall being extended above the side wall of the main receptacle and said main receptacle being provided with an annular relatively wide bottom flanged coextensive with the bottom thereof, said overflow chamber also including an inner wall of downwardly flaring form connected at its upper edge to the upper edge of the side wall of the main receptacle and spaced from the latter and radial air tubes connecting the walls of the overflow chamber and communicating at one end with the space between said chamber and the main receptacle and at the other end with the space surrounding said chamber and a series of curved pipe sections or tubes providing intercommunication between said radial tubes.

In testimony whereof I affix my signature in presence of two witnesses.

JOSEPH SLOBODA.

Witnesses:
SIMON RICHBVSKY,
ANDY W. SHRANKS.